United States Patent [19]
Rodriguez Ramos

[11] Patent Number: 5,549,326
[45] Date of Patent: Aug. 27, 1996

[54] AIR BAG

[75] Inventor: Jose L. Rodriguez Ramos, Madero, Mexico

[73] Assignee: TRW Vehicle Safety Systems Inc., Lyndhurst, Ohio

[21] Appl. No.: 457,857

[22] Filed: Jun. 1, 1995

[51] Int. Cl.⁶ ............................................. B60R 21/16
[52] U.S. Cl. .................................. 280/743.1; 280/728.2
[58] Field of Search ............................. 280/728.1, 732, 280/728.2, 743.1

[56] References Cited

U.S. PATENT DOCUMENTS

| | | | |
|---|---|---|---|
| 5,074,585 | 12/1991 | Satoh | 280/732 |
| 5,087,071 | 2/1992 | Wallner et al. | 280/743.1 |
| 5,205,583 | 4/1993 | Henseler et al. | 280/743.1 |
| 5,310,216 | 5/1994 | Wehner et al. | 280/743.1 |
| 5,316,337 | 5/1994 | Yamaji et al. | 280/743.1 |

*Primary Examiner*—Paul N. Dickson
*Attorney, Agent, or Firm*—Tarolli, Sundheim, Covell, Tummino & Szabo

[57] ABSTRACT

An air bag (10) is made from a single panel (40) of fabric material which is folded and sewn to define an inflation fluid volume. The panel (40) has a generally rectangular configuration. Two retainer portions (44, 46) of the panel (40) project from opposite ends of a main body portion (42) of the panel. The panel (40) is folded along a fold line (140) so that the retainer portions (44, 46) overlie one another, as do end portions (70, 72) of the panel. The retainer portions (44, 46) and end portions (70, 72) of the panel (40) are sewn together, and a retainer (180) is then sewn into the joined retainer portions.

14 Claims, 3 Drawing Sheets

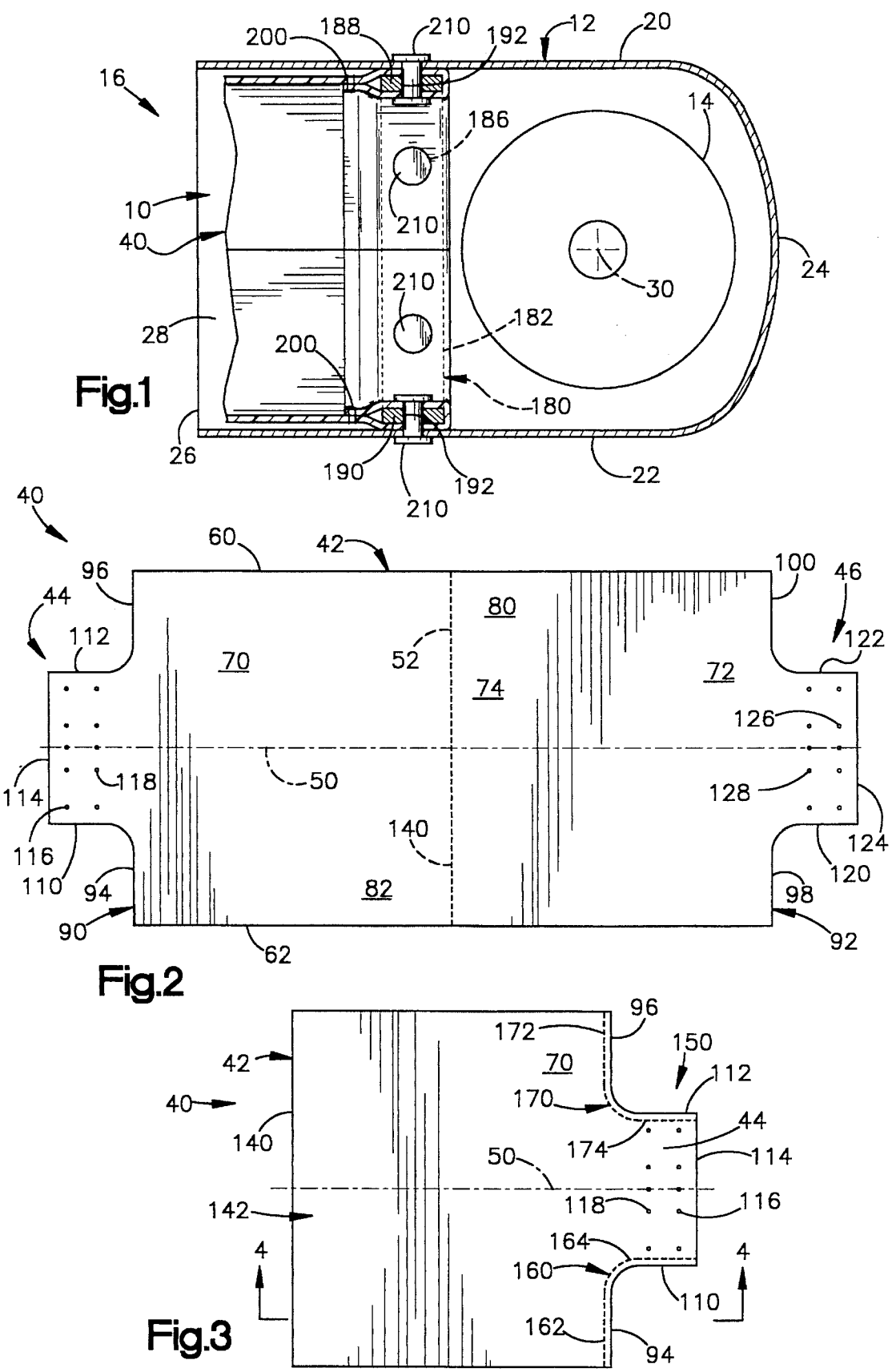

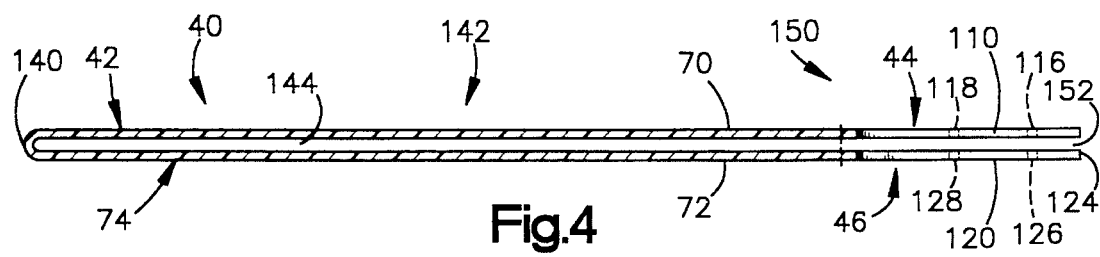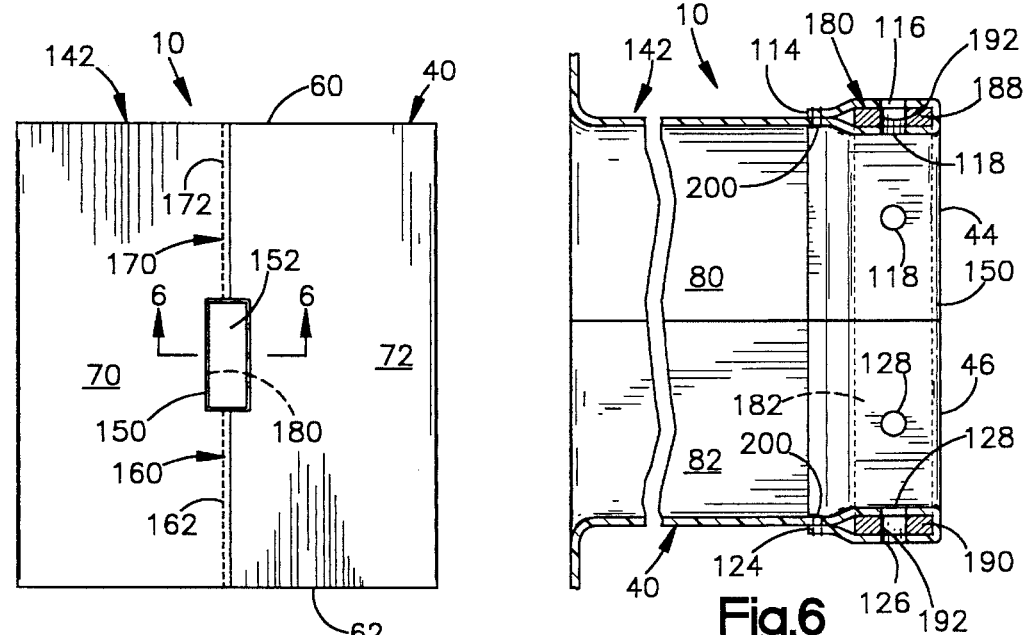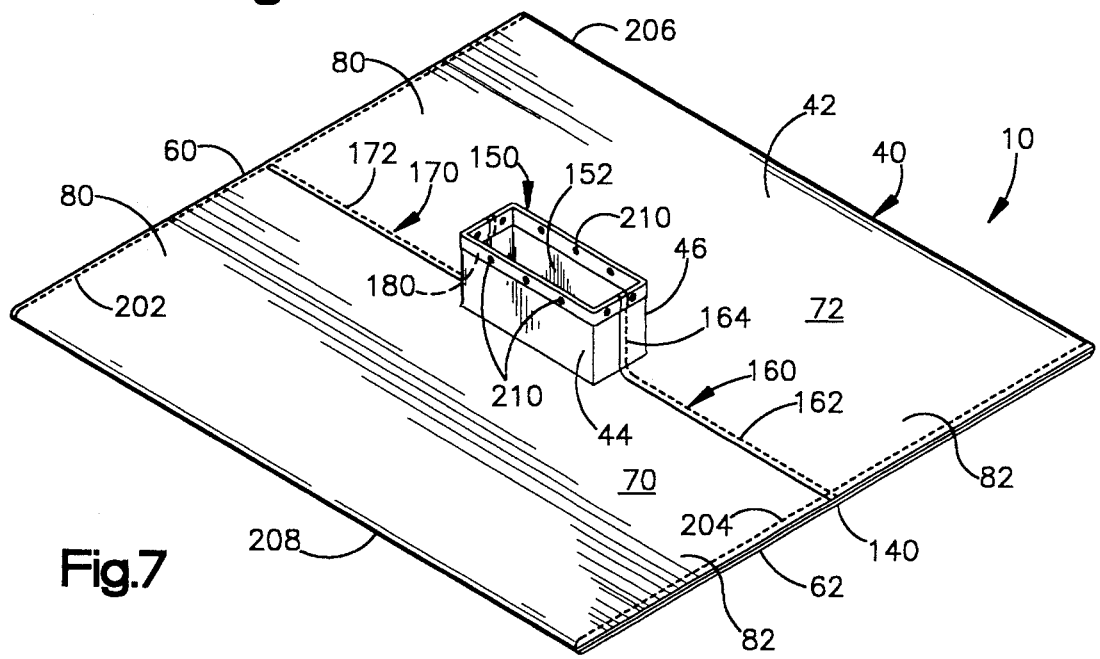

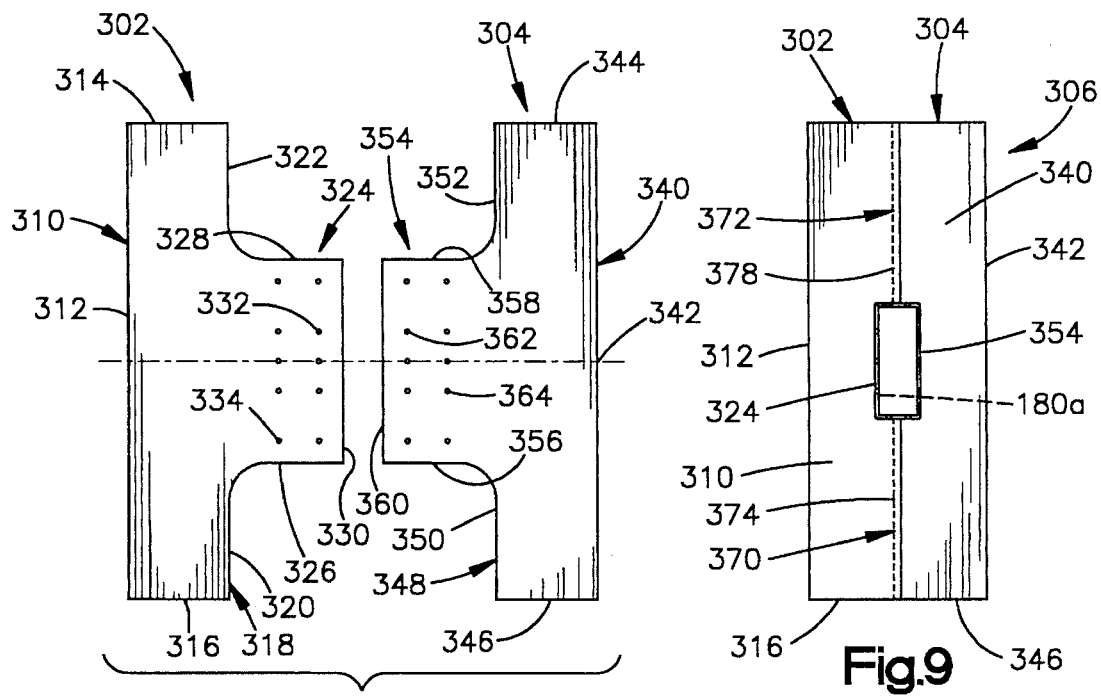
Fig.8
Fig.9
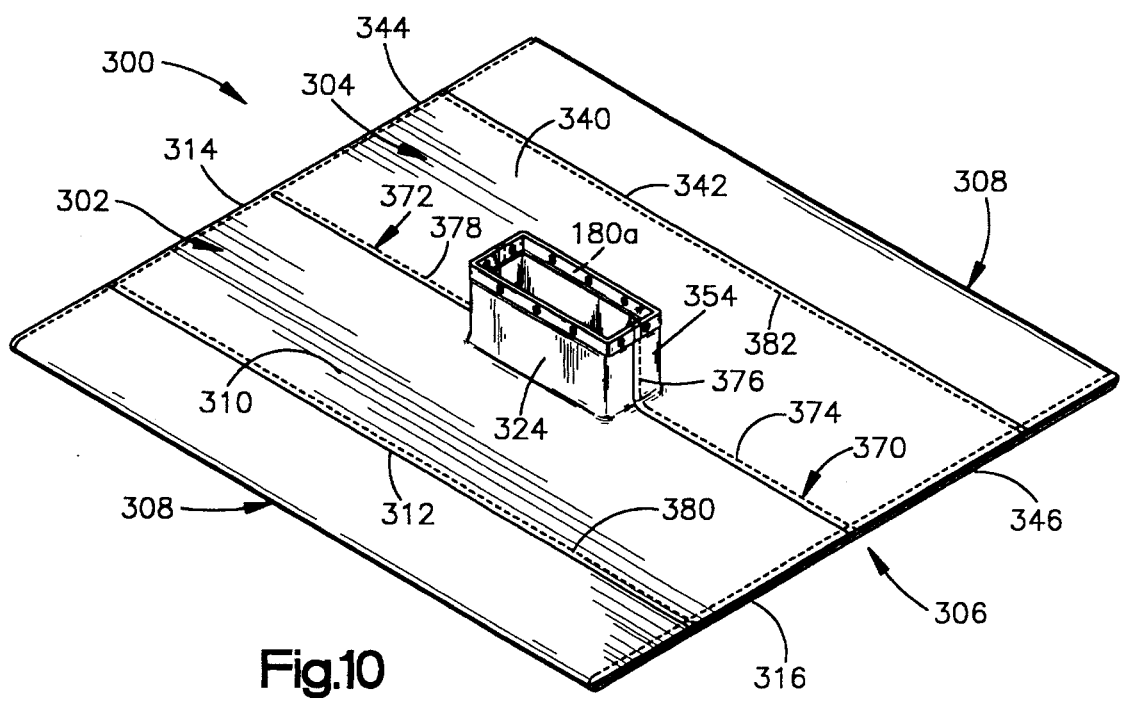
Fig.10

5,549,326

AIR BAG

BACKGROUND OF THE INVENTION

1. Technical Field

The present invention relates to an inflatable vehicle occupant restraint and particularly to an air bag made from one or more panels of fabric material.

2. Description of the Prior Art

A typical air bag module includes an inflatable vehicle occupant restraint or air bag made from one or more panels of fabric material sewn to a desired shape to form the air bag. It is desirable to minimize the number of panels, and thus the amount of sewing needed, to simplify manufacturing and reduce costs.

SUMMARY OF THE INVENTION

The present invention is an inflatable restraint for use with a source of inflation fluid and for, when, inflated, restraining a passenger of a vehicle. The inflatable restraint comprises a single panel of fabric material having a main body portion and first and second retainer portions. A central axis extends through the main body portion and between the first and second retainer portions. The main body portion of the panel has a generally rectangular configuration and includes first and second opposite side edges which extend generally parallel to each other and to the axis. The main body portion of the panel includes first and second opposite end portions having respective first and second opposite end edges which extend generally parallel to each other and between the side edges. The first retainer portion of the panel projects from the first end portion of the panel in a direction away from the main body portion of the panel. The second retainer portion of the panel projects from the second end portion of the panel in a direction away from the main body portion of the panel. The panel is folded along a first fold line extending transverse to the axis so that the first end portion of the panel overlies the second end portion to form a body portion of the inflatable restraint defining an inflation fluid volume. The first retainer portion of the panel overlies the second retainer portion to form a mouth portion of the inflatable restraint defining an inflation fluid opening through which inflation fluid is directed into the inflation fluid volume to inflate the body portion of the inflatable restraint. First and second stitching lines join the overlying first and second end portions and the overlying first and second retainer portions of the panel. The second stitching line is disposed on a side of the axis opposite from the first stitching line. A retaining ring attaches the mouth portion of the inflatable restraint adjacent to the inflation fluid source. The mouth portion is folded back over the retaining ring and encircles the retaining ring.

The present invention is also an inflatable restraint for use with a source of inflation fluid and for, when, inflated, restraining a passenger of a vehicle. The inflatable restraint comprises a main body portion of fabric material formed of at least one panel, and first and second retainer portions of fabric material connected with the main body portion. A longitudinal axis extends through the main body portion and between the first and second retainer portions. The main body portion has a generally rectangular configuration and includes first and second opposite side edges which extend generally parallel to each other and to the longitudinal axis. The main body portion includes first and second opposite end portions having respective first and second opposite end edges which extend generally parallel to each other and between the side edges. The first retainer portion projects from the first end portion in a direction away from the main body portion. The second retainer portion projects from the second end portion in a direction away from the main body portion. The main body portion is folded along a first fold line extending transverse to the longitudinal axis so that the first end portion overlies the second end portion to form a body portion of the inflatable restraint defining an inflation fluid volume. The first retainer portion overlies the second retainer portion to form a mouth portion of the inflatable restraint defining an inflation fluid opening through which inflation fluid is directed into the inflation fluid volume to inflate the body portion of the inflatable restraint. First and second stitching lines join the overlying first and second end portions and the overlying first and second retainer portions, the second stitching line being disposed on a side of the longitudinal axis opposite from the first stitching line. A retainer attaches the mouth portion of the inflatable restraint adjacent to the inflation fluid source. The mouth portion is folded back over the retainer and encircles the retainer.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic sectional view of an air bag module including an air bag constructed in accordance with a first embodiment of the present invention;

FIG. 2 is a plan view of a panel of fabric material which is shown in a condition prior to being folded and sewn to make the air bag of FIG. 1;

FIG. 3 is a plan view of the panel of FIG. 2 after the panel is folded and the end portions of the panel are sewn together;

FIG. 4 is a sectional view taken along line 4—4 of FIG. 3;

FIG. 5 is a top plan view of the panel in a condition after a retaining ring is connected with the panel;

FIG. 6 is a sectional view taken along line 6—6 of FIG. 5;

FIG. 7 is a pictorial view of the assembled air bag of FIGS. 1–6;

FIG. 8 is a plan view similar to FIG. 1 of a pair of fabric material panels which are used to construct an air bag in accordance with a second embodiment of the present invention;

FIG. 9 is a view, similar to FIG. 5, of the air bag of FIG. 8 showing a retaining ring connected with two panels; and FIG. 10 is a pictorial view, similar to FIG. 7, of the assembled air bag of FIGS. 8 and 9.

DESCRIPTION OF PREFERRED EMBODIMENTS OF THE INVENTION

The present invention relates to an inflatable vehicle occupant restraint, and is particularly directed to an air bag for restraining a vehicle occupant in the event of sudden vehicle deceleration such as occurs in a vehicle collision. The present invention is applicable to various inflatable restraint constructions. As representative of the present invention, FIG. 1 illustrates an air bag 10.

The air bag 10 is folded and stored in a housing 12 along with an inflator indicated schematically at 14. The inflator 14 has an elongate cylindrical shape with opposite ends secured to opposite side walls (not shown) of the housing 12. The air bag 10, the housing 12, and the inflator 14 together form a vehicle safety apparatus or air bag module 16.

The housing 12 is made of sheet metal and includes parallel generally planar upper and lower walls 20 and 22. The housing 12 further includes a curved central wall 24 extending between and interconnecting the upper wall 20 and the lower wall 22 to form the C-shaped cross-sectional configuration shown in FIG. 1. The edges of the housing upper and lower walls 20 and 22 and the edges of the side walls (not shown) define a deployment opening 26 in the housing 12 opposite the central wall 24. The housing walls also define a chamber 28 in the housing 12. An axis 30 of the air bag module 16 extends longitudinally between the side walls of the housing 12.

The air bag module 16 includes fastening means such as bolts (not shown) for securing the housing 12 to a portion of the vehicle such as the vehicle instrument panel. The air bag module 16 also includes a cover (not shown) which closes the deployment opening 26 in the housing 12. The cover is preferably made of a suitable plastic material and forms a portion of the vehicle instrument panel.

In the preferred embodiment, the air bag 10 is made from a single panel 40 of fabric material, preferably woven nylon. The panel 40 (FIG. 2) includes a main body portion 42 and first and second retainer portions 44 and 46 which project from opposite ends of the main body portion. It should be understood that the panel 40, and specifically the main body portion 42, could be made from more than one piece of fabric material. The panel 40 is symmetrical about a longitudinal axis 50 and also about a transverse axis 52 which extends perpendicular to the longitudinal axis. Two side edges 60 and 62 of the main body portion 42 form side edges of the panel 40 and extend parallel to the longitudinal axis 50.

The main body portion 42 of the panel 40 has a generally rectangular configuration and includes a first end portion 70 and a second end portion 72 disposed on opposite sides of the transverse axis 52. The transverse axis 52 extends through an intermediate portion 74 of the panel 40 which is disposed between the end portions 70 and 72. The panel 40 also has first and second side portions 80 and 82, which are disposed on opposite sides of the longitudinal axis 50 and which extend the length of the main body portion 42.

The main body portion 42 of the panel 40 has first and second opposite end edges 90 and 92 which extend generally parallel to each other and between the side edges 60 and 62. The first end edge 90 of the panel includes a first section 94 and a second section 96 which are spaced apart from each other on opposite sides of the first retainer portion 44. The second end edge 92 of the panel including a first section 98 and a second section 100 which are spaced apart from each other on opposite sides of the second retainer portion 46.

The first retainer portion 44 of the panel 40 has a generally rectangular shape and projects from the first end edge 90 of the panel in a direction away from the main body portion 42 of the panel. First and second opposite side edges 110 and 112 of the first retainer portion 44 extend parallel to the longitudinal axis 50. An end edge 114 of the first retainer portion 44 extends between the side edges 110 and 112 in a direction parallel to the transverse axis 52. Two parallel rows of fastener openings 116 and 118 are formed in the first retainer portion 44 of the panel 40. The rows of fastener openings 116 and 118 extend parallel to the transverse axis 52 of the panel 40.

The second retainer portion 46 of the panel 40 is a mirror image of the first retainer portion 44 and has a generally rectangular shape. The second retainer portion 46 projects from the second end edge 92 in a direction away from the main body portion 42 of the panel 40. First and second opposite side edges 120 and 122 of the second retainer portion 46 extend parallel to the longitudinal axis 50. An end edge 124 of the second retainer portion 46 extends between the side edges 120 and 122 in a direction parallel to the transverse axis 52. Two parallel rows of fastener openings 126 and 128 are formed in the second retainer portion 46 of the panel 40. The rows of fastener openings 126 and 128 extend in a direction parallel to the transverse axis 52.

In the process of folding and sewing the panel 40 to make the air bag 10, the panel is folded along a fold line 140 (FIGS. 2–4) which is coextensive with the transverse axis 52. The first end portion 70 pivots relative to the second end portion 72, about the fold line 140, to a position overlying the second end portion as seen in FIGS. 3 and 4.

When the panel 40 is in the folded condition shown in FIGS. 3 and 4, the main body portion 42 of the panel, i.e., the first and second end portions 70 and 72 and the intermediate portion 74, forms a body portion 142 of the air bag 10. The first retainer portion 44 of the panel 40 overlies the second retainer portion 46 to form a mouth portion 150 of the air bag 10. Because the mouth portion 150 of the air bag 10 is formed as one piece with the body portion 142 of the air bag, there is no need to sew the mouth portion of the air bag to the body portion.

The body portion 142 of the air bag 10 defines an inflation fluid volume 144. The mouth portion 150 defines an inflation fluid opening 152 which is in fluid communication with the inflation fluid volume 144 and through which inflation fluid is directed into the inflation fluid volume to inflate the body portion 142 of the air bag 10. The one row of fastener openings 116 in the first retainer portion 44 of the panel 40 overlies the one row of fastener openings 126 in the second retainer portion 46. The other row of fastener openings 118 in the first retainer portion 44 of the panel 40 overlies the other row of fastener openings 128 in the second retainer portion 46 of the panel.

After being folded as shown in FIGS. 3 and 4, the panel 40 is sewn with first and second generally L-shaped stitching lines 160 and 170. Each one of the stitching lines 160 and 170 (FIG. 3) joins the overlying first and second end portions 70 and 72 and the overlying first and second retainer portions 44 and 46 of the panel 40. One leg 162 of the first stitching line 160 extends along the first sections 94 and 98 of the first and second end edges 90 and 92 of the main body portion 42, in a direction parallel to the transverse axis 52. The other leg 164 of the first stitching line 160 extends along the first side edges 110 and 120 of the first and second retainer portions 44 and 46 of the panel 40, in a direction parallel to the longitudinal axis 50.

One leg 172 of the second stitching line 170 extends along the second sections 96 and 100 of the first and second end edges 90 and 92 of the main body portion 42, in a direction parallel to the transverse axis 52. The other leg 174 of the second stitching line 170 extends along the second side edges 112 and 122 of the first and second retainer portions 44 and 46, in a direction parallel to the longitudinal axis 50.

The panel 40 is then joined with a retainer 180 which forms a part of the air bag 10. The retainer 180 (FIGS. 5–7) is a ring-shaped metal member having a rectangular central opening. The retainer 180 includes first and second opposite end portions 182 each having two spaced fastener openings 186 (FIG. 1). The retainer 180 also includes first and second opposite side portions 188 and 190, each having three spaced fastener openings 192.

The retainer 180 is placed around the mouth portion 150 of the air bag 10 to encircle the first and second retainer portions 44 and 46 of the panel 40. The axially outermost parts of the mouth portion 150, including the end edges 114 and 124, are folded out and back over the retainer 180, as best seen in FIG. 6, to encircle the retainer. The fastener openings 116, 118, 126 and 128 in the panel 40 are aligned with the fastener openings 186 and 192 in the retainer 180. The panel 40 is then sewn at a third stitching line 200 placed as close as possible to the retainer 180. The third stitching line 200 joins the mouth portion 150 to itself to secure the retainer 180 to the panel 40.

The air bag 10 is then turned inside out and folded along two parallel fold lines 206 and 208 into the condition shown in FIG. 7. The sides of the folded panel 40 are next sewn together. The first side portion 80 of the panel 40 is sewn with a stitching line 202. The stitching line 202 includes a series of stitches arranged in a straight line which extends along the first side edge 60 between the fold lines 206 and 208. In the same manner, the second side portion 82 of the panel 40 is sewn with a stitching line 204. The stitching line 204 includes a series of stitches arranged in a straight line which extends along the second side edge 62 between the fold lines 206 and 208.

The retainer 180 and the mouth portion 150 of the air bag 10 are secured to the housing 12 with a series of fasteners such as rivets 210 which extend through the fastener openings 116, 118, 126 and 128 in the panel 40 and through the fastener openings 186 and 192 in the retainer 180. The mouth portion 150 of the air bag 10 is disposed adjacent to the inflator 14. The air bag 10 is folded in a known manner (not shown) to fit within the housing 12.

In the event of a vehicle event requiring inflation of the air bag 10, such as sudden vehicle deceleration, electric circuitry of the vehicle (not shown) including a collision sensor causes an electric current to flow to the inflator 14. The inflator 14 directs inflation fluid into the chamber 28 in the housing 12. The inflation fluid flows through the inflation fluid opening 152 in the mouth portion 150 of the air bag 10 and into the inflation fluid volume 144 in the body portion 142 of the air bag. The body portion 142 of the air bag 10 inflates and extends rearward through the deployment opening 26. The air bag 10 moves from the folded and stored condition to an unfolded and inflated condition (not shown) to restrain a vehicle occupant.

FIGS. 8–10 illustrate an air bag 300 which is constructed in accordance with a second embodiment of the present invention. In the air bag 300, first and second panels 302 and 304 are sewn together to form a retainer panel 306 of the air bag 300. The retainer panel 306 is then sewn together with a retainer 180a which is identical to the retainer 180 (FIGS. 1–7), and with a center panel 308, to complete the air bag 300.

The first panel 302 (FIG. 8) is identical in configuration to the left end portion (as viewed in FIG. 2) of the panel 40 of the first embodiment of the invention. Thus, the first panel 302 includes a generally rectangular first body portion 310 having a first end edge 312, parallel side edges 314 and 316, and a second end edge 318. The second end edge includes two sections 320 and 322. A first retainer portion 324 of the first panel 302 is generally rectangular in configuration and projects from the second end edge 318 of the first body portion 310. The first retainer portion 324 has parallel side edges 326 and 328 and an end edge 330.

Two parallel rows of fastener openings 332 and 334 are formed in the first retainer portion 324. The rows of fastener openings 332 and 334 extend parallel to the end edge 330 of the first retainer portion 324 and parallel to the first end edge 312 of the main body portion 310.

The second panel 304 is a mirror image of the first panel 302 and is identical in configuration to the right end portion (as viewed in FIG. 2) of the panel 40 of the first embodiment of the invention. Thus, the second panel 304 includes a generally rectangular second body portion 340 having a first end edge 342, parallel side edges 344 and 346, and a second end edge 348. The second end edge 348 includes two sections 350 and 352. A second retainer portion 354 of the second panel 304 is generally rectangular in configuration and projects from the second end edge 348 of the second body portion 340. The second retainer portion 354 has parallel side edges 356 and 358 and an end edge 360.

Two parallel rows of fastener openings 362 and 364 are formed in the second retainer portion 354. The rows of fastener openings 362 and 364 extend parallel to the end edge 360 of the second retainer portion 354 and parallel to the first end edge 312 of the second body portion 310.

In assembling the air bag 300, the first panel 302 is sewn to the second panel 304 in the same manner as the shown in FIG. 3 with respect to the first embodiment of the invention. Specifically, the first panel 302 is placed in a position overlying the second panel 304. The first panel 302 is sewn to the second panel 304 with first and second generally L-shaped stitching lines 370 and 372 (FIGS. 9 and 10). A first leg 374 of the first stitching line 370 extends along the first section 320 of the second end edge 318 of the first panel 302, and along the first section 350 of the second end edge 348 of the second panel 304. A second leg 376 of the first stitching line 370 extends along the first side edge 326 of the first retainer portion 324 of the first panel 302, and along the first side edge 356 of the second retainer portion 354 of the second panel 304.

A first leg 378 of the second stitching line 372 extends along the second section 322 of the second end edge 318 of the first panel 302, and along the second section 352 of the second end edge 348 of the second panel 304. A second leg (not shown) of the second stitching line 372 extends along the second side edge 328 of the first retainer portion 324 of the first panel 302, and along the second side edge 358 of the second retainer portion 354 of the second panel 304.

After the first panel 302 is thus sewn to the second panel 304 to form the retainer panel 306, the retainer 180a is sewn to the retainer panel with a third stitching line in the same manner in which the retainer 180 is sewn in the air bag 10 with the third stitching line 200. The retainer panel 306 is then sewn together with the center panel 308, which is a single piece of fabric material. A stitching line 380 extends along the first end edge 312 of the first body portion 310 of the first panel 302 to join the first panel to the center panel 308. Another stitching line 382 extends along the first end edge 342 of the second body portion 340 of the second panel 304 to join the second panel to the center panel 308.

The sides of the air bag 300 are then sewn with stitching lines 384 and 386 to complete the air bag 300. The retainer portions 324 and 354 form a mouth portion of the air bag 300. The first and second body portions 310 and 340, together with the center panel 308, form a main body portion of the air bag 300. This three-panel construction of the air bag 300, like the one-panel construction of the air bag 10, eliminates the need to sew a mouth portion to the body portion of the air bag. The air bag 300 may be substituted for the air bag 10 in the air bag module 16 (FIG. 1).

From the above description of the invention, those skilled in the art will perceive improvements, changes, and modifications in the invention. For example, the panel 40 could be asymmetrical to provide an air bag 10 which inflates farther in one direction, such as laterally. Such improvements, changes, and modifications within the skill of the art are intended to be covered by the appended claims.

Having described the invention, I claim:

1. An inflatable restraint for use with a source of inflation fluid and for, when, inflated, restraining a passenger of a vehicle, said inflatable restraint comprising:

a single panel of fabric material having a main body portion and first and second retainer portions, said panel having a longitudinal axis extending through said main body portion and between said first and second retainer portions;

said main body portion of said panel having a generally rectangular configuration and including first and second opposite side edges which extend generally parallel to each other and to said longitudinal axis, said main body portion of said panel including first and second opposite end portions having respective first and second opposite end edges which extend generally parallel to each other and between said side edges;

said first retainer portion of said panel projecting from said first end portion of said panel in a direction away from said main body portion of said panel, said first retainer portion having first and second side edges which extend generally parallel to said longitudinal axis;

said second retainer portion of said panel projecting from said second end portion of said panel in a direction away from said main body portion of said panel, said second retainer portion having first and second side edges which extend generally parallel to said longitudinal axis;

said panel being folded along a first fold line extending transverse to said longitudinal axis so that said first end portion of said panel overlies said second end portion to form a body portion of said inflatable restraint defining an inflation fluid volume, said first retainer portion of said panel overlying said second retainer portion to form a mouth portion of said inflatable restraint defining an inflation fluid opening through which inflation fluid is directed into said inflation fluid volume to inflate said body portion of said inflatable restraint, said first side edge of said first retainer portion overlying said first side edge of said second retainer portion, said second side edge of said first retainer portion overlying said second side edge of said second retainer portion;

first and second stitching lines joining said overlying first and second end portions and said overlying first and second retainer portions of said panel, said second stitching line being disposed on a side of said longitudinal axis opposite from said first stitching line, each one of said first and second stitching lines having a first leg which extends generally transverse to said longitudinal axis of said panel and a second leg which extends generally parallel to said longitudinal axis of said panel along respective overlying side edges of said retainer portions; and a retainer for attaching said mouth portion of said inflatable restraint adjacent to the inflation fluid source, said mouth portion being folded back over said retainer and encircling said retainer, said retainer having a ring-shaped configuration defining a central opening in said retainer, said mouth portion of said inflatable restraint extending through said central opening of said retainer, said retainer encircling said mouth portion of said inflatable restraint;

said overlying first side edges of said first and second retainer portions and said first stitching line being folded back over said retainer and encircling said retainer, said overlying second side edges of said first and second retainer portions and said second stitching line being folded back over said retainer and encircling said retainer.

2. An inflatable restraint as set forth in claim 1 wherein said inflatable restraint comprises a third stitching line joining said folded-over mouth portion of said inflatable restraint to itself to secure said mouth portion of said inflatable restraint to said retainer.

3. An inflatable restraint as set forth in claim 2 wherein said inflatable restraint comprises fourth and fifth stitching lines extending along said first and second opposite side edges of said main body portion to close the sides of said inflatable restraint.

4. An inflatable restraint as set forth in claim 1 wherein each one of said first and second side edges of said main body portion of said panel is substantially longer than each one of said first and second end edges of said main body portion of said panel, said retainer portions of said panel projecting from said end edges of said main body portion of said panel.

5. An inflatable restraint as set forth in claim 1 wherein each one of said retainer portions has a generally rectangular configuration.

6. An inflatable restraint as set forth in claim 1 wherein each one of said first and second retainer portions of said panel includes a respective plurality of fastener openings, said retainer including a plurality of fastener openings which are aligned with said fastener openings in said first and second retainer portions when said mouth portion of said inflatable restraint is folded back over said retainer and encircles said retainer.

7. An inflatable restraint for use with a source of inflation fluid and for, when, inflated, restraining a passenger of a vehicle, said inflatable restraint comprising:

a single panel of fabric material having a generally rectangular main body portion and first and second retainer portions;

said main body portion of said panel having first and second opposite side edges which extend generally parallel to each other, said main body portion of said panel having first and second opposite end edges which extend generally parallel to each other and between said side edges, said panel having first and second opposite side portions and first and second opposite end portions;

said first retainer portion of said panel having a generally rectangular shape and projecting from said first end edge of said panel, at a location intermediate said first and second side edges of said panel, in a direction away from said main body portion of said panel, said first retainer portion of said panel having first and second opposite side edges;

said first retainer portion of said panel dividing said first end edge of said panel into a first section and a second section spaced apart from said first section;

said second retainer portion of said panel having a generally rectangular shape and projecting from said second end edge of said panel, at a location intermediate said first and second side edges of said panel, in a direction away from said main body portion of said panel, said second retainer portion of said panel having first and second opposite side edges;

said second retainer portion of said panel dividing said second end edge of said panel into a first section and a second section spaced apart from said first section;

said panel being folded such that said first end portion of said panel overlies said second end portion to form a body portion of said inflatable restraint defining an inflation fluid volume and said first retainer portion overlies said second retainer portion to form a mouth portion of said inflatable restraint defining an inflation fluid opening in fluid communication with said inflation fluid volume and through which inflation fluid is directed into said inflation fluid volume to inflate said body portion of said inflatable restraint, said first side edge of said first retainer portion overlying said first side edge of said second retainer portion, said second side edge of said first retainer portion overlying said second side edge of said second retainer portion;

a first stitching line joining said overlying first and second end portions and said overlying first and second retainer portions of said panel, said first stitching line extending along said first section of said first end edge of said main body portion and along said first section of said second end edge of said main body portion, said first stitching line also extending along and joining said first side edge of said first retainer portion and said first side edge of said second retainer portion;

a second stitching line joining said overlying first and second end portions and said overlying first and second retainer portions of said panel, said second stitching line extending along said second section of said first end edge of said main body portion and along said second section of said second end edge of said main body portion, said second stitching line also extending along and joining said second side edge of said first retainer portion and along said second side edge of said second retainer portion;

a retainer for attaching said mouth portion of said inflatable restraint adjacent to the inflation fluid source;

said retainer extending around said mouth portion of said inflatable restraint, said mouth portion of said inflatable restraint being folded back over said retainer and encircling said retainer;

said overlying first side edges of said first and second retainer portions and said first stitching line being folded back over said retainer and encircling said retainer, said overlying second side edges of said first and second retainer portions and said second stitching line being folded back over said retainer and encircling said retainer;

a third stitching line joining said mouth portion of said inflatable restraint to itself to secure said mouth portion of said inflatable restraint to said retainer.

8. An inflatable restraint as set forth in claim 7 wherein said retainer has a ring-shaped configuration defining a central opening in said retainer, said mouth portion of said inflatable restraint extending through said central opening of said retainer, said retainer encircling said mouth portion of said inflatable restraint.

9. An inflatable restraint as set forth in claim 8 wherein said inflatable restraint comprises a third stitching line joining said folded-over mouth portion of said inflatable restraint to itself to secure said mouth portion of said inflatable restraint to said retainer, said inflatable restraint further comprising fourth and fifth stitching lines extending along said first and second opposite side edges of said inflatable restraint.

10. An inflatable restraint as set forth in claim 7 wherein each one of said first and second side edges of said main body portion of said panel is substantially longer than each one of said first and second end edges of said main body portion of said panel, said retainer portions projecting from said end edges of said main body portion of said panel.

11. An inflatable restraint as set forth in claim 7 wherein each one of said first and second retainer portions of said panel includes a respective plurality of fastener openings, said retainer including a plurality of fastener openings which are aligned with said fastener openings in said first and second retainer portions when said mouth portion of said inflatable restraint is folded back over said retainer and encircles said retainer.

12. An inflatable restraint for use with a source of inflation fluid and for, when, inflated, restraining a passenger of a vehicle, said inflatable restraint comprising a retainer panel made of only first and second panels of fabric material, and a center panel;

said first panel having a main body portion and a first retainer portion, said main body portion of said first panel having first and second opposite side edges which extend generally parallel to each other, said main body portion of said first panel having first and second opposite end edges which extend generally parallel to each other and between said side edges;

said first retainer portion of said first panel having a generally rectangular shape and projecting from said second end edge of said first panel in a direction away from said main body portion of said first panel, said first retainer portion of said first panel having first and second opposite side edges, said first retainer portion of said first panel dividing said first end edge of said first panel into a first section and a second section spaced apart from said first section;

said second panel having a main body portion and a second retainer portion, said main body portion of said second panel having first and second opposite side edges which extend generally parallel to each other, said main body portion of said second panel having first and second opposite end edges which extend generally parallel to each other and between said side edges;

said second retainer portion of said second panel having a generally rectangular shape and projecting from said second end edge of said second panel in a direction away from said main body portion of said second panel, said second retainer portion of said second panel having first and second opposite side edges, said second retainer portion of said second panel dividing said second end edge of said second panel into a first section and a second section spaced apart from said first section;

a generally L-shaped first stitching line joining said first and second panels, said first stitching line having a first leg extending along said first section of said second end edge of said first panel and along said first section of said second end edge of said second panel, said first stitching line also having a second leg extending along said first side edge of said first retainer portion and said first side edge of said second retainer portion;

a generally L-shaped second stitching line joining said first and second panels, said second stitching line having a first leg extending along said second section of said second end edge of said first panel and along said second section of said second end edge of said second panel, said second stitching line also having a second leg extending along said second side edge of said first retainer portion and said second side edge of said second retainer portion;

said first retainer portion of said first panel and said second retainer portion of said second panel forming a mouth portion of said inflatable restraint defining an inflation fluid opening through which inflation fluid is directed into said inflatable restraint to inflate said inflatable restraint;

a retainer for attaching said mouth portion of said inflatable restraint adjacent to the inflation fluid source, said retainer extending around said mouth portion of said inflatable restraint, said mouth portion of said inflatable restraint being folded back over said retainer and encircling said retainer;

said retainer having a ring-shaped configuration defining a central opening in said retainer, said mouth portion of said inflatable restraint extending through said central opening of said retainer, said retainer encircling said mouth portion of said inflatable restraint;

said inflatable restraint comprising a third stitching line joining said mouth portion of said inflatable restraint to itself to secure said mouth portion of said inflatable restraint to said retainer.

13. An inflatable restraint as set forth in claim 12 wherein said center panel comprises a single panel of fabric material which is sewn to and which extends between said first end edge of said first panel and said first end edge of said second panel.

14. An inflatable restraint as set forth in claim 12 wherein each one of said first and second retainer portions of said panel includes a respective plurality of fastener openings, said retainer including a plurality of fastener openings which are aligned with said fastener openings in said first and second retainer portions when said mouth portion of said inflatable restraint is folded back over said retainer and encircles said retainer.

* * * * *